3,251,734
PROCESS FOR PRESERVING YEAST WITH 11β-HYDROXY - 11(2 - PYRIDYLMETHYL)PREGNANE-3,20-DIONE
Gunther S. Fonken, Charleston Township, Kalamazoo County, Mich., assignor to The Upjohn Company, Kalamazoo, Mich., a corporation of Delaware
No Drawing. Filed Apr. 25, 1963, Ser. No. 275,527
2 Claims. (Cl. 167—30)

The present invention relates to a method for preventing liquefaction in packed yeast and a yeast cake. More particularly, this invention relates to inhibiting the growth of *Micrococcus flavus* by contacting the organism with 11β-hydroxy-11-(2-pyridylmethyl)pregnane-3,20-dione.

This application is a continuation-in-part of Serial No. 200,297, filed June 6, 1962.

*Micrococcus flavus* is a bacterial organism which contaminates yeast cultures and commercial yeast cakes. The yeast cake is a familiar product of commerce and, when contaminated, changes from the solid condition to semisolid and fluid condition depending upon the degree of contamination.

It has now been discovered according to the present invention that 11β-hydroxy-11-(2-pyridylmethyl)pregnane-3,20-dione will inhibit the growth of *Micrococcus flavus* when brought in contact with the viable cells.

The contact between the steroid and microorganisms is facilitated by use of a carrier, the simplest being water. Other fluid carriers adapted to washing or spraying operations can also be used, as can aerosols.

Solutions are useful for the cleaning of the apparatus used in yeast production to prevent contamination of the yeast.

For inhibiting the growth of *Micrococcus flavus* a preferred concentration of 11β-hydroxy - 11 - (2 - pyridylmethyl)pregnane-3,20-dione of from about 0.001 to about 0.1% is used, the precent being w./v. for fluids such as wash solutions and w./w. for solids such as yeast cakes.

The active compounds of the present invention are prepared starting with a pregnane-3,11,20 - trione 3,20 - bis-(alkylene ketal).

The main steroid starting material, 5β-pregnane-3,11,20-trione 3,20-bis(ethylene ketal) was prepared as shown in U.S. Patent 2,897,198, which is the method employed by Oliveto et al. [J.A.C.S., 75, 486 (1953)].

In the same manner, the 5α-pregnane-3,11,20-trione 3,20-bis(ethylene ketal) has been prepared by reacting allopregnane-3,11,20-trione with ethylene glycol in the presence of p-toluenesulfonic acid monohydrate in toluene solution.

According to the process of this invention, to the lithium Grignard reagent, α-picolyllithium, dissolved in an organic solvent, inert to the reaction, such as ether, tetrahydrofuran, benzene and the like, is added 5β- (or 5α-) pregnane-3,11,20-trione 3,20-bis ketal. The addition of the steroid is generally made at a temperature between —40 and 30° C., but higher or lower temperatures, not interfering with the solubility of the steroid and reactant, can be used. The time of reaction is usually between 6 and 96 hours, but shorter or longer periods are also operative. The amount of heat evolved in this reaction is rather small and cooling is therefore generally unnecessary. At the termination of the reaction, the solution is generally washed with water, dried and evaporated and the residue thus obtained is purified by standard methods, such as extraction, recrystallization and chromatography.

The ketal groups of the thus-obtained 11α-substituted steroid are removed by methods well known in the art such as acid hydrolysis, with dilute sulfuric or hydrochloric acid, in an organic solvent such as methanol, ethanol and the like.

PREPARATION 1

11α-(2-pyridylmethyl)-11β-hydroxy-5β-pregnane-3,20-dione-3,20-bis(ethylene ketal)

A solution was prepared of α-picolyllithium using 6.9 g. of lithium wire, in the procedure shown in Org. Syn. 23, 83 (1943). To this solution was added rapidly a solution of 20.9 gm. (50 millimoles) of 5β-pregnane-3,11, 20-trione 3,20-bis(ethylene ketal), dissolved in 100 ml. of benzene and 100 ml. of ether. During the addition a very small amount of heat was evolved. After the mixture had stood at room temperature (22 to 26° C.) during a period of three days, it was washed (cautiously) four times with water, filtered through sodium sulfate and concentrated at reduced pressure to a thick oil which was chromatographed over Florisil, taking fraction of 1.5 l. as follows:

TABLE 1

| Fraction: | Solvent |
| --- | --- |
| 1 | Skellysolve B. |
| 2 | 2% acetone-Skellysolve B hexanes. |
| 3 | 5% acetone-Skellysolve B hexanes. |
| 4 | 10% acetone-Skellysolve B hexanes. |
| 5 | 25% acetone-Skellysolve B hexanes. Acetone. |

Fraction 5 was evaporated and the residue recrystallized from methanol to give 13.44 gm. of crude 11α-(2-pyridylmethyl)-11β-hydroxy-5β-pregnane-3,20-dione 3,20 - bis-(ethylene ketal) of melting point 148 to 152° C. A further recrystallization of a sample from methanol gave pure 11α-(2-pyridylmethyl)-11β-hydroxy-5β - pregnane - 3,20-dione 3,20-bis(ethylene ketal) of melting point 154 to 156° C., rotation [α]$_D$ —58° (in acetone);

$$\lambda_{max.}^{EtOH}\ 264\ m\mu$$

a$_M$ 3775.

PREPARATION 2

11α-(2-pyridylmethyl)-11β-hydroxy-5β-pregnane-3,20-dione

A solution of 5 gm. of 11α-(2-pyridylmethyl)-11β-hydroxy-5β-pregnane-3,20-dione 3,20-bis(ethylene ketal) in 500 ml. of methanol was stirred overnight at room temperature with 100 ml. of N hydrochloric acid. The mixture was concentrated to 100 ml. of volume in vacuo and thereupon 200 ml. of aqueous 4% sodium bicarbonate solution was added. The precipitated product was recovered by filtration. Recrystallization from aqueous methanol gave 2.68 gm. of 11α-(2-pyridylmethyl)-11β-hydroxy-5β-pregnane-3,20-dione of melting point 167 to 172° C. Recrystallization of this material gave pure 11α-(2-pyridylmethyl)-11β-hydroxy-5β-pregnane-3,20 - dione of melting point 170 to 173° C. after two recrystallizations from aqueous methanol. Rotation of this material was [α]$_D$ —10° in acetone.

*Analysis.*—Calcd. for $C_{27}H_{37}NO_3$: C, 76.56; H, 8.81; N, 3.31. Found: C, 76,37; H, 9.06; N, 3.39.

PREPARATION 3

11α-(2-pyridylmethyl)-11β-hydroxy-5α-pregnane-3,20-dione 3,20-bis(ethylene ketal)

5α-pregnane-3,11,20-trione 3,20-bis(ethylene ketal) was reacted as in Preparation 1 with α-picolyllithium. The mixture was allowed to stand for 42 hours, was thereupon washed with water and the organic layer filtered through sodium sulfate and concentrated at reduced pressure. The material was two times extracted with 10% acetone-Skellysolve B solution and the extract discarded. The remainder was recrystallized three times from methanol to give 11α-(2-pyridylmethyl)-11β-hydroxy-5α-pregnane - 3, 20-dione 3,20-bis(ethylene ketal).

PREPARATION 4

*11α-(2-pyridylmethyl)-11β-hydroxy-5α-pregnane-3,20-dione*

A solution of 2 gm. of 11α-(2-pyridylmethyl)-11β-hydroxy-5α-pregnane-3,20-dione 3,20-dione 3,20 - bis(ethylene ketal) in 200 ml. of methanol was stirred for a period of 18 hours at room temperature with 50 ml. of N hydrochloric acid. The mixture was concentrated to a volume of 40 ml. in vacuo. After the product was recovered by filtration it was recrystallized from aqueous methanol to give pure crystalline 11α-(2-pyridylmethyl)-11β-hydroxy-5α-pregnane-3,20-dione.

PREPARATION 5

*11α-(2-pyridylmethyl)-11β-hydroxy-5β-pregnane-3,20-dione hydrochloride*

To a solution of 4.2 gm. (0.01 mole) of 11α-(2-pyridylmethyl)-11β-hydroxy-5β-pregnane-3,20-dione dissolved in 200 ml. of methanol is added 10 cc. of 1 molar aqueous hydrochloric acid solution. The hydrochloride salt is recovered in a dry state by vacuum evaporation of the solvent.

In similar manner, the sulfate, nitrate and perchlorate salts are prepared by substituting a stoichiometric amount of sulfuric, nitric and perchloric acids for the hydrochloric acid.

In similar manner, salts of 11α-(2-pyridylmethyl)-11β-hydroxy-5α-pregnane-3,20-dione are prepared.

EXAMPLE 1

To a 10,000 liter culture tank seeded with yeast and containing in substrate of 50% total sugar, 1.8% nitrogen as ammonium sulfate and 0.8% phosphorous as disodium acid phosphate is added 100 gm. of 11β-hydroxy-11-(2-pyridylmethyl)pregnane-3,20-dione.

The addition of the steroid will prevent the growth of *M. flavus* in the culture tank.

EXAMPLE 2

Following separation of the yeast cream and the washing thereof and at the time of blending and addition of plasticizer, 100 mg. of 11β-hydroxy-11 - (2 - pyridylmethyl)pregnane-3,20-dione is added for each kilogram of yeast cake. The yeast cake is then extended in block form, cut, wrapped and refrigerated for commerce.

When so prepared the yeast cakes are resistant to liquefaction due to *M. flavus*.

What is claimed is:

1. A process for inhibiting the growth of *Micrococcus flavus* comprising the contacting viable *Micrococcus flavus* cells with a member selected from the group consisting of 11β-hydroxy-11-(2-pyridylmethyl)pregnane-3,20-dione and the acid addition salts thereof.

2. The process of claim 1 wherein the said member is in combination with a carrier in a concentration of from about 0.001 to about 0.1%.

References Cited by the Examiner

UNITED STATES PATENTS

| | | | |
|---|---|---|---|
| 770,356 | 9/1904 | Davies et al. | 99—96 |
| 1,641,676 | 9/1927 | Hill et al. | 99—96 |
| 3,113,078 | 12/1963 | Neely | 195—96 |

A. LOUIS MONACELL, *Primary Examiner.*

D. M. STEPHENS, *Assistant Examiner.*